(12) United States Patent
Becker et al.

(10) Patent No.: US 12,006,146 B2
(45) Date of Patent: Jun. 11, 2024

(54) STACKING STORAGE ARRANGEMENT AND METHOD FOR OPERATING A STACKING STORAGE ARRANGEMENT

(71) Applicant: Jungheinrich Aktiengesellschaft, Hamburg (DE)

(72) Inventors: Michael Becker, Hainburg (DE); Jörg Cavelius, Bad Vilbel (DE); Markus Liebhaber, Oberursel (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 580 days.

(21) Appl. No.: 17/123,877

(22) Filed: Dec. 16, 2020

(65) Prior Publication Data

US 2021/0188546 A1 Jun. 24, 2021

(30) Foreign Application Priority Data

Dec. 19, 2019 (EP) .................................... 19218183

(51) Int. Cl.
| | | |
|---|---|---|
| *B65G 1/04* | (2006.01) | |
| *B65G 1/14* | (2006.01) | |
| *B65G 57/30* | (2006.01) | |
| *B65G 59/06* | (2006.01) | |
| *B66F 9/065* | (2006.01) | |
| *B66F 9/12* | (2006.01) | |

(52) U.S. Cl.
CPC ............. *B65G 1/0471* (2013.01); *B65G 1/14* (2013.01); *B65G 57/302* (2013.01); *B65G 59/063* (2013.01); *B66F 9/065* (2013.01); *B66F 9/12* (2013.01)

(58) Field of Classification Search
CPC ....... B65G 1/0471; B65G 1/14; B65G 57/302
See application file for complete search history.

(56) References Cited

U.S. PATENT DOCUMENTS

| 5,131,804 A | 7/1992 | Focke et al. |
| 5,415,519 A * | 5/1995 | Lee ........................ B65H 31/26 |
| | | 414/791.2 |

(Continued)

FOREIGN PATENT DOCUMENTS

| CN | 110143445 | 8/2019 |
| DE | 198 49 391 | 2/2002 |

(Continued)

OTHER PUBLICATIONS

Machine translation of DE1984939 from espacenet. (Year: 2000).*

(Continued)

*Primary Examiner* — Mark C Hageman
(74) *Attorney, Agent, or Firm* — GREENBLUM & BERNSTEIN, P.L.C.

(57) ABSTRACT

A stacking storage arrangement and method of operating stacking storage arrangement. The stacking storage arrangement includes multiple container receiving spaces and a loading space arranged below the container receiving spaces. A loading vehicle that is movable in the loading space includes a chassis and a container seat that is height-adjustable relative to the chassis. A holding device is arranged between each container receiving space and the loading space and a hold-open device is arranged on the chassis separately from the container seat.

17 Claims, 3 Drawing Sheets

(56) References Cited

U.S. PATENT DOCUMENTS 11,230,446 B2 * 1/2022 Morawietz ........... B65G 1/0471
2017/0036859 A1 2/2017 Lopes Ribeiro

FOREIGN PATENT DOCUMENTS

DE 102013009340 * 12/2014 ........... B65G 1/0471
JP S59 108618 6/1984
NL 9 300 418 10/1994

OTHER PUBLICATIONS

Machine translation of JP59108618 from espacenet. (Year: 1984).*
Europe Search Report/Office Action conducted in counterpart Europe Appln. No. 19218183.2-1017 (Jun. 25, 2020).
China Search Report conducted in counterpart China Appln. No. 202010612035 (Mar. 23, 2022) (w/ translation).
China Office Action Report conducted in counterpart China Appln. No. 202010612035 (Mar. 31, 2022) (w/ translation).

* cited by examiner

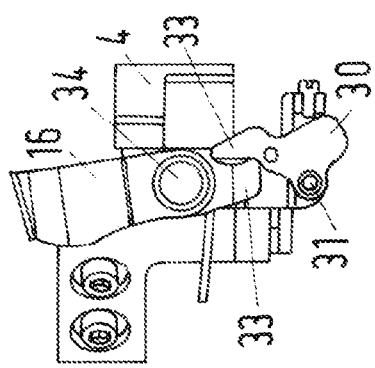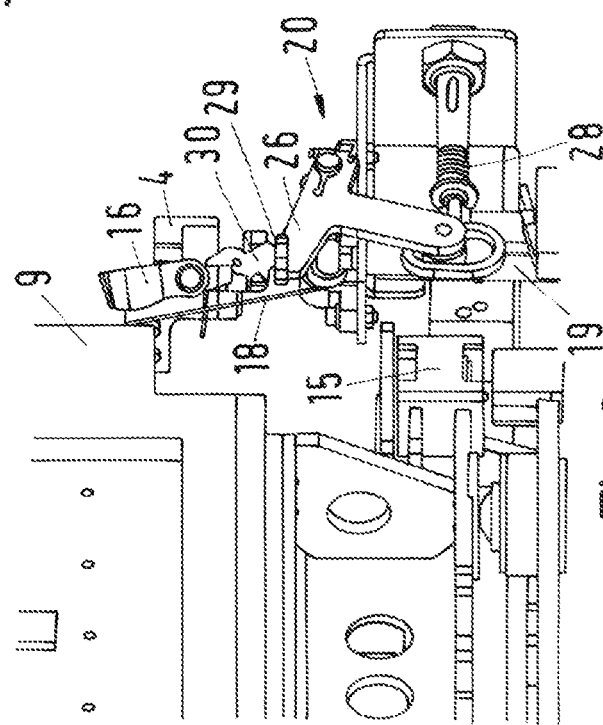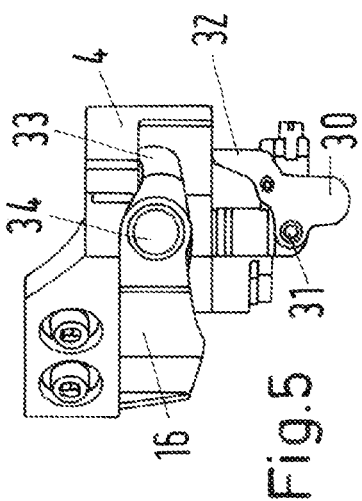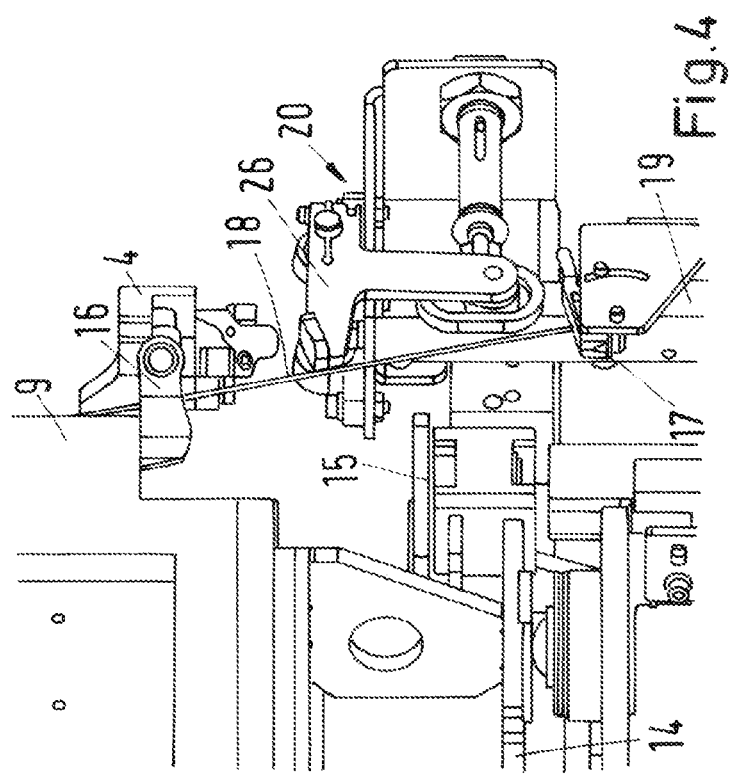

STACKING STORAGE ARRANGEMENT AND METHOD FOR OPERATING A STACKING STORAGE ARRANGEMENT

CROSS-REFERENCE TO RELATED APPLICATIONS

The present application claims priority under 35 U.S.C. § 119 of European Patent Application No. 19 218 183.2 filed Dec. 19, 2019, the disclosure of which is expressly incorporated by reference herein in its entirety.

BACKGROUND

1. Field of the Invention

The present invention relates to a stacking storage arrangement having multiple container receiving spaces, a loading space arranged below the container receiving spaces, and a loading vehicle that can be moved in the loading space. The loading vehicle comprises a chassis and a container seat that is height-adjustable relative to the chassis. A releasable holding device for removing a container is arranged between each container receiving space and the loading space.

The invention furthermore relates to a method for operating a stacking storage arrangement having multiple container receiving spaces, in which at least one container is removed from a container receiving space with the aid of a loading vehicle that can be moved in a loading space arranged below the container receiving space. The loading vehicle comprises a chassis and a container seat that is height-adjustable relative to the chassis, and a holding device arranged between each container receiving space and the loading space is released.

2. Discussion of Background Information

A stacking storage arrangement of this type and a method of this type are known from DE 198 49 391 C2, for example.

To place a container into storage in a container receiving space, the loading vehicle is driven beneath a container receiving space and then lifts the container until it comes into contact with the, up to this point, bottommost container of the stack. If raised further, the container opens the holding device. When the container has been moved far enough past the holding device, the container, with the stack that may be located thereon, is lowered again so that the holding device can lock in place beneath the container. When a container is removed, the container, possibly with a stack of other containers located thereon, is once again lifted. An opening device arranged on the container seat thereby engages with the holding device and opens the holding device. If the container is lowered, the opening device keeps the holding device open until the container has been moved past, and the holding device then locks in place beneath the next container.

If a container is to be removed from the stacking storage arrangement, but that container is not the bottommost container of a stack, the containers located beneath the desired container must first be restacked, that is, the containers must be removed and stowed in another container receiving space. This requires time and energy.

SUMMARY

Embodiments of the invention provide a stacking storage arrangement operable in an economical manner.

In embodiments, a stacking storage arrangement of the type named at the outset includes a hold-open device arranged on the chassis separately from the container seat. With the hold-open device, the stacking storage arrangement can be operated such that the holding device does not close automatically again when the container resting on the container seat is removed from the container receiving space in a downward direction. Instead, the holding device can be kept open with the hold-open device, and two or more containers, for example, can be removed from the container receiving space in a single movement. As a result, restacking operations can be performed in a shorter amount of time and with fewer driving movements of the loading vehicle.

Preferably, the holding device comprises multiple holding elements. The hold-open device has a quantity of hold-open elements that corresponds at least to the quantity of the holding elements. An assignment can thus be carried out such that one hold-open element can act on each holding element and each holding element can thereby be held in an open position.

Preferably, the hold-open device comprises a drive arrangement arranged on the chassis. The drive arrangement is then also not arranged on the container seat and is not moved with the container seat, but rather is located on the chassis, that is, in a stationary manner in relation to the hold-open device.

Preferably, a force-limiting device is arranged between the drive arrangement and the hold-open device. Certain imprecisions and tolerances are thus acceptable. The hold-open device can only act on the holding device with a force that is limited by the force-limiting device, so that unevenness in the driving surface on which the loading vehicle is driven, for example, no longer plays a role. Even if the drive arrangement always operates, and thus acts on the hold-open device, with the same stroke, damage to the holding device from too large a movement by the hold-open device is avoided.

Preferably, the drive arrangement comprises a preloaded drive element and a motor that acts on the drive element against the preload. The preload can, for example, act on the drive element in a direction in which the hold-open device acts on the holding device.

The motor is preferably embodied as a rotary motor. A rotary motor, which can for example be embodied as a stepper motor or the like, is easy to control.

Preferably, the hold-open device is arranged outside of an opening that connects the container receiving space with the loading space. The hold-open device is thus arranged outside of a path of movement through which a container is moved from the container receiving space into the loading space or vice versa, and therefore does not interfere with a movement of the container.

Preferably, the holding device comprises a fixing element that can be moved between a first position, in which it holds the holding element in an open position, and a second position, in which it does not act on the holding element, wherein the fixing element can be actuated by the hold-open device. The holding device can, for example, be opened by a movement of the container seat, and it can then merely be provided that the hold-open device holds the respective holding element in the open position with the aid of the fixing element. Thus, the hold-open device can be constructed to be relatively small and can be operated with relatively small forces.

Preferably, the fixing element is pivotably mounted. For example, the fixing element can be embodied as a lever which can be pivoted about an axis.

Preferably, the fixing element is preloaded into the second position. It is thus ensured that an accidental holding-open of the holding device cannot occur. If there is no drive energy, the holding device is placed automatically in a state in which it can hold a container or a container stack.

Preferably, an unlocking device for releasing the holding device is arranged on the loading vehicle. The unlocking device can, for example, be arranged on the height-adjustable container seat and opens the holding device when a container is lifted.

In embodiments, a method of the type named at the outset includes a holding device that is held open using a hold-open device arranged on the chassis separately from the container seat.

Thus, it is no longer necessary for the container seat to keep the holding device open when the container is to be removed from the container receiving space. Instead, the hold-open device is used for this purpose, as a result of which multiple containers can also be removed from the container receiving space at the same time.

Preferably, the holding device is opened by lifting the container seat. Known elements can then be used for the opening or releasing of the holding device. Only the holding-open is used as an additional function in this case.

It is also preferred that multiple containers are removed from a container receiving space at the same time. A restacking operation can thus be carried out in a short amount of time.

Embodiments are directed to a stacking storage arrangement that includes multiple container receiving spaces and a loading space arranged below the container receiving spaces. A loading vehicle movable in the loading space includes a chassis and a container seat that is height-adjustable relative to the chassis. A holding device is arranged between each container receiving space and the loading space; and a hold-open device is arranged on the chassis separately from the container seat.

According to embodiments, the holding device can include multiple holding elements and the hold-open device may include a number of hold-open elements that corresponds at least to a number of the plurality of the holding elements.

In other embodiments, the hold-open device may include a drive arrangement arranged on the chassis. A force-limiting device can be arranged between the drive arrangement and an actuating lever of the hold-open device. Moreover, the drive arrangement can include a preloaded drive element and a motor that acts on the drive element against the preload. The motor may be embodied as a rotary motor.

In accordance with other embodiments, the hold-open device may be arranged outside of an opening that connects the container receiving space with the loading space.

According to still other embodiments, the holding device may include a fixing element that can be moved between a first position, in which the fixing element can hold the holding element in an open position, and a second position, in which the fixing element does not act on the holding element, and the fixing element can be actuatable by the hold-open device. The fixing element may be pivotably mounted. The fixing element can be preloaded into the second position.

In other embodiments, the loading vehicle may further include an unlocking device for releasing the holding device.

Embodiments are directed to a method for operating a stacking storage arrangement having multiple container receiving spaces that includes removing at least one container from a container receiving space with the aid of a loading vehicle located in a loading space arranged below the container receiving space. The loading vehicle includes a chassis and a container seat that is height-adjustable relative to the chassis. The method also includes releasing a holding device arranged between the container receiving space and the loading space and holding the released holding device open with a hold-open device arranged on the chassis separately from the container seat.

In accordance with embodiments, the holding device may be released by lifting the container seat.

According to other embodiments, at least one container removed from the container receiving space can include multiple containers removed from the container receiving space at a same time.

Embodiments are directed to a method for operating in the stacking storage arrangement described above, where the method includes moving the loading vehicle into the loading space; lifting the container seat upwardly toward the container receiving space, wherein the container seat lifts at least one container within the container receiving space and wherein the holding device for supporting the at least one container is moved; and lowering the container seat and moving the loading vehicle out of the loading space.

In embodiments, when the container seat is lowered, the at least one container may be supported on the container seat. The at least one container is supported by the holding device in the container receiving space while the loading vehicle is moved into the loading space, and the method can further include, while lifting the at least one container in the container receiving space, moving the holding device into an open position; actuating the hold-open device to fix the holding device in the open position; lowering the at least one container past the holding device in the open position to remove the at least one container from the container receiving space; and deactivating the hold-open device, whereby the holding device moves into a closed position after the at least one container is lowered below the holding device. Moreover, the at least one container removed from the container receiving space may include multiple containers removed from the container receiving space at a same time.

In accordance with still yet other embodiments, when the container seat is lowered, the container seat may be empty. The at least one container can be supported on the container seat while the loading vehicle is moved into the loading space, and method may further include contacting the holding device with the at least one container to move the holding device out of a closed position as the container is lifted in the at least one container receiving space, wherein, when a support surface of the at least one container is lifted above the holding device, the holding device returns to the closed position; and lowering the at least one container to be supported the holding device.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 4 shows a schematic illustration of the holding device in a closed position;

FIG. 5 shows an enlarged detail from FIG. 4;

FIG. 6 shows the holding device from FIG. 4 in an open position; and

FIG. 7 shows an enlarged illustration of a detail from FIG. 6.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
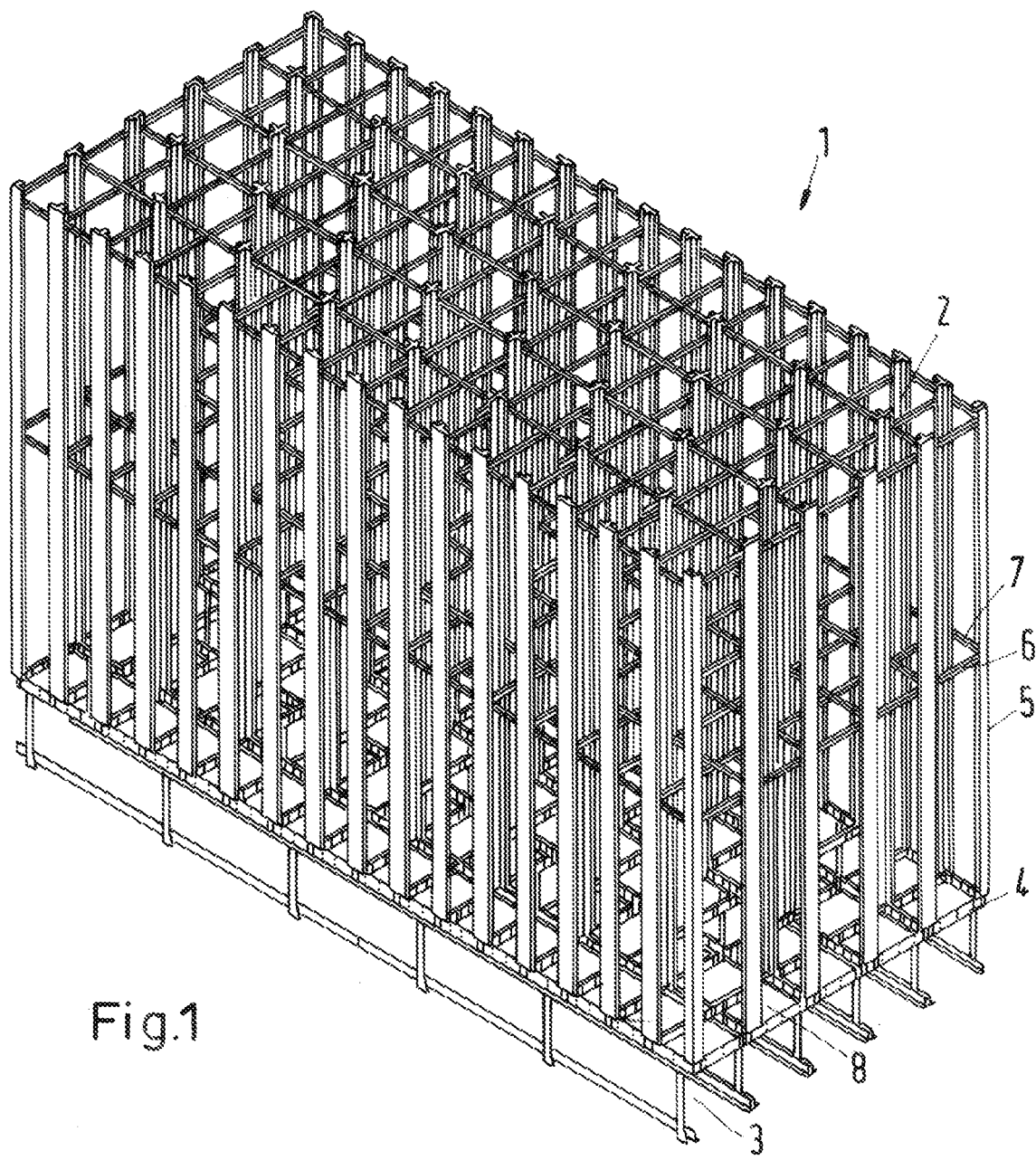
FIG. 1 shows a schematic illustration of a stacking storage arrangement.

FIG. 1 schematically shows a stacking storage arrangement having multiple container receiving spaces 2 and a loading space 3 arranged below the container receiving spaces 2.

Between the container receiving spaces 2 and the loading space 3, a frame arrangement 4 is arranged. On the frame arrangement 4, uprights 5 are arranged which are connected to one another by transverse braces 6 and longitudinal braces 7.

For each container receiving space 2, the frame arrangement 4 comprises an opening 8 through which the container receiving space 2 is connected to the loading space 3.

Figure 2:
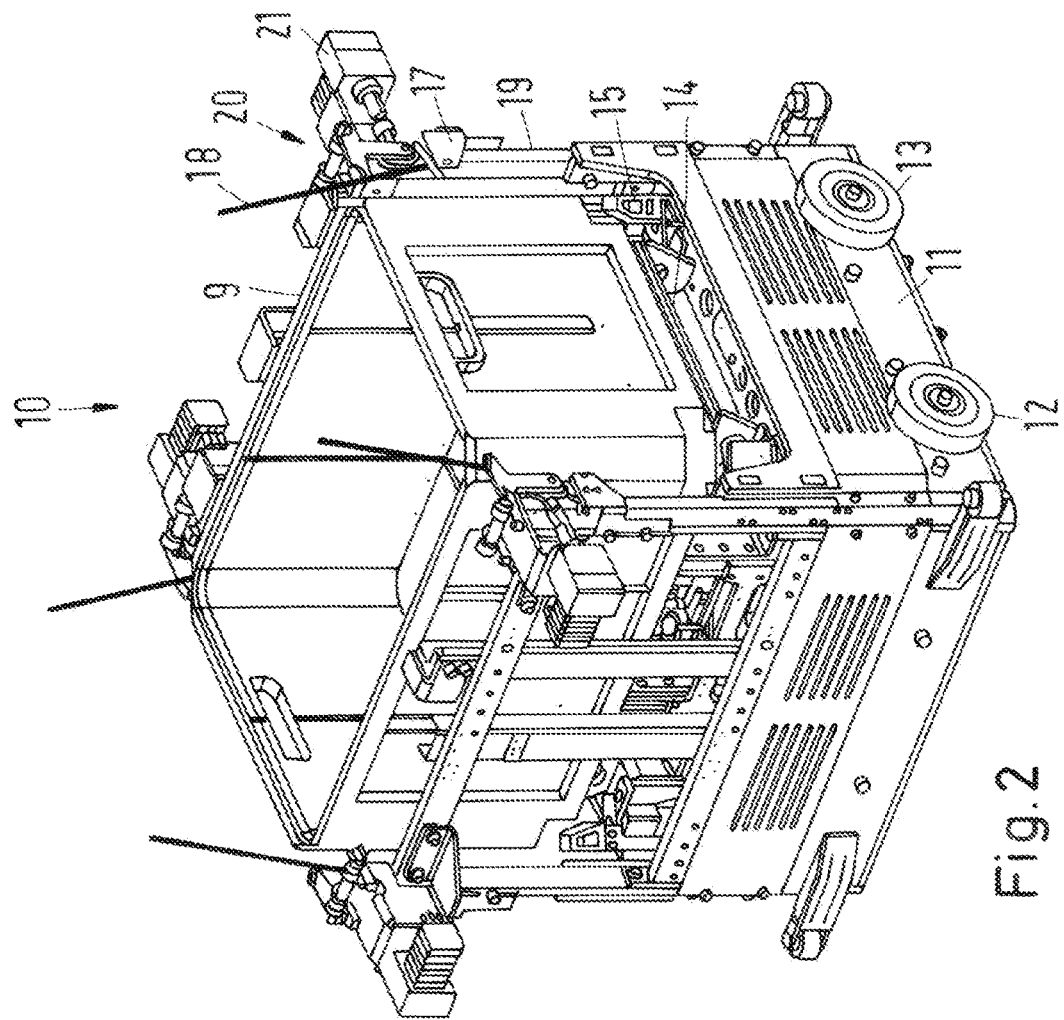
FIG. 2 shows a perspective illustration of a loading vehicle.

To place containers 9 into storage in a container receiving space 2 or remove a container from a container receiving space 2, a loading vehicle 10 illustrated in FIG. 2 is provided. The loading vehicle 10 can be driven into the loading space 3 and moved in this location.

The loading vehicle comprises a chassis 11 with wheels 12, 13. The loading vehicle 10 furthermore comprises a container seat 14 which, in a manner not illustrated in greater detail, is height-adjustable so that a container 9 arranged on the container seat 14 can be lifted and lowered.

Unlocking elements 15 of an unlocking device can be arranged on the container seat 14. The unlocking elements 15 can be lifted together with the container seat 14 in order to move a holding device, of which one holding element 16 each is illustrated in FIGS. 4 through 7, from a holding position (FIGS. 4 and 5) into a release position (FIGS. 6 and 7). The holding elements 16 are attached to the frame arrangement 4, that is, to the bottom end of a container receiving space 2. The holding elements 16 can thus either hold a container 9 in place in a container receiving space 2 (FIG. 4), or they make it possible for the container 9 to be removed from the container receiving space 2 in a downward direction (FIG. 6).

In the present exemplary embodiment, four holding elements 16 each form one holding device. However, it is also possible to embody the holding device with only two holding elements 16, which in this case are arranged, for example, at diagonally opposing corners of the opening of a container receiving space 2.

In the present exemplary embodiment, the loading vehicle 10 comprises for each holding element 16 a sensor 17 that can determine, for example with the aid of a light beam 18, whether the holding element 16 is located in the locking position illustrated in FIG. 4 or in the release position illustrated in FIG. 6.

Figure 3A:
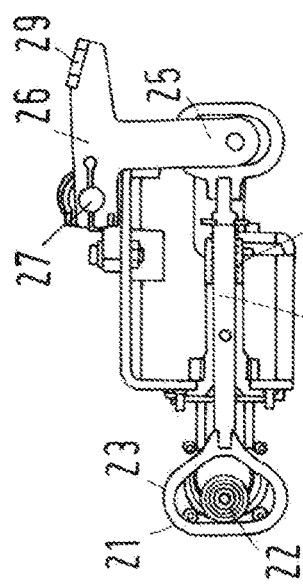
FIGS. 3A-3C show parts of a hold-open device.
Figure 3B:
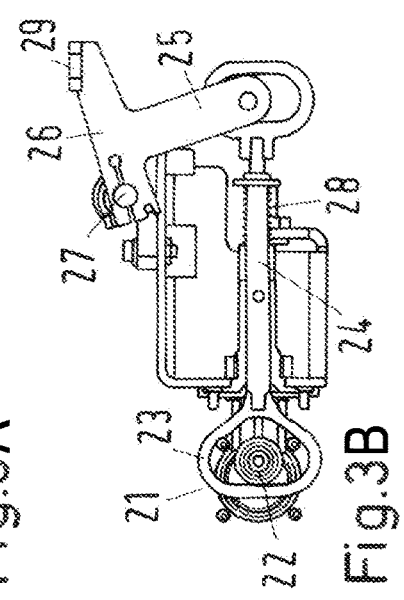
Figure 3C:
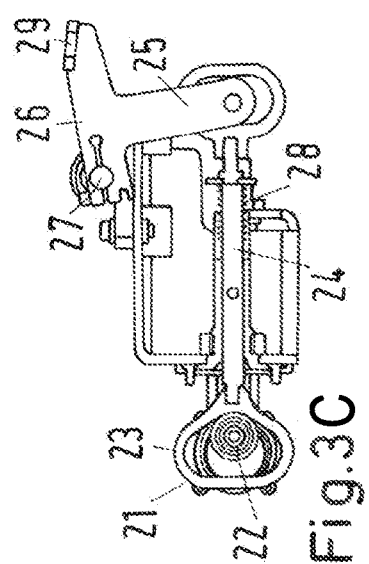

The sensors 17 are attached to posts 19 of the loading vehicle 10. A hold-open device 20 is also arranged on the posts. Each hold-open device 20 comprises a motor 21, for example an electric motor, that is embodied as a rotary motor. The motor 21 drives an eccentrically arranged drive wheel 22 (FIGS. 3A-3C). The drive wheel 22 is arranged in the interior of an essentially triangular connecting link 23. When the motor 21 is actuated, the drive wheel 22 produces a linear movement of the connecting link 23. The connecting link 23 is connected to a tappet 24, the other end of which acts on a drive segment 25 of an actuating lever 26. The actuating lever 26 can be pivoted about an axis 27.

The tappet 24 is loaded by a spring 28, namely in a direction facing away from the drive wheel 22, so that the motor 21 must always operate against the force of the spring 28.

Thus, if the motor 21 moves the drive wheel 22 into the position illustrated in FIG. 3A, then the drive wheel 22 pulls the tappet 24, and therefore the actuating lever 26, into an "unactuated" position. If, on the other hand, the motor 21 has moved the drive wheel 22 into the position illustrated in FIG. 3B, the tappet 24 is moved by the spring 28 into a position of maximum displacement and thus pivots the actuating lever 26 into a position in which it is "maximumly actuated."

If, on the other hand, a force that is larger than a force with which the spring 28 acts on the actuating lever 26 acts on the actuating lever 26, more precisely on a pressure face 29 of the actuating lever 26, then the actuating lever 26 is pivoted into the position illustrated in FIG. 3C, in which it is "minimally actuated." The spring 28 thus forms a force-limiting device so that the actuating lever 26 is force-controlled and cannot cause any damage even when the motor 21 rotates the drive wheel 22 into a position of maximum deflection.

Since the actuating lever 26 acts on the holding device directly or indirectly, damage to the holding device is thus reliably prevented.

FIGS. 4 and 5 then show a holding element 16 of the holding device in a closed position, that is, in a position in which the container 9 rests on the holding element 16. In this position, the container cannot move downwards past the holding element 16. It is thus held in the container receiving space 2. The hold-open device 20 is unactuated. The sensor 17 can sense the "closed position" of the holding element 16 with the aid of the light beam 18.

If the container 9 is to be removed, then the container seat 14 is raised until unlocking element 15 comes into contact with holding element 16 in order to pivot holding element 16 into an "open position," which is illustrated in FIG. 6. In this open position of holding element 16, container 9 can be guided/lowered past holding element 16. If no unlocking elements 15 are present, the opening or unlocking of the holding elements 16 can also occur in a different manner.

From FIGS. 5 and 7, it can be seen that a fixing element 30 is assigned to the holding element 16, which fixing element 30 is embodied as a lever that can be pivoted about an axis 31.

If the actuating lever 26 is then pivoted into the actuated position illustrated in FIG. 6 from the unactuated position illustrated in FIG. 4, then it acts with the contact surface 29 thereof on the fixing element 30 and pivots it such that it acts with a nose 32 on a holding arm 33 of the holding element 16, and therefore holds the holding element 16, which can be pivoted about a pivot axis 34, in the open or unlocked position.

The hold-open device 20 and a lifting drive of the container seat 14, which lifting drive is not illustrated in greater detail, are thereby connected by a shared control device. The control device does not actuate the hold-open device 20 until the lifting device 14 has been lifted far enough that the unlocking device with the unlocking elements 15 has pivoted the holding elements 16 of the holding device into the open or released position.

The hold-open device 20 is arranged outside of an opening 8 that connects the container receiving space 2 with the loading space 3. A movement of the container 9 from the container receiving space 2 into the loading space 3 or vice versa is thus not impeded by the hold-open device 20.

The holding elements 16 are embodied such that they once again pivot into the locking position thereof illustrated in FIG. 4 when not acted on by the hold-open device 20. This can be achieved, for example, in that the holding elements 16 are loaded by a return spring. This can also be achieved in that the holding elements 16 have a mass distribution that is embodied such that the center of mass of the holding element 16 is always located on a side of the pivot axis 34 to which the holding element 16 is to be returned. As soon as the hold-open device 20 has been deactivated, the holding element 16 automatically moves into the holding position illustrated in FIG. 4.

The fixing element 30 is preloaded by a spring, which is not illustrated in greater detail, in the direction of a position in which the fixing element 30 no longer acts on the holding element 16. The spring thus applies a torque to the fixing element 30, which torque is directed clockwise in relation to the illustration in FIGS. 5 and 7.

Thus, once the actuating lever 26 no longer acts on the fixing element 30, the fixing element 30 automatically pivots back into the position illustrated in FIGS. 4 and 5, and the holding element can then easily pivot back into the holding position illustrated in FIGS. 4 and 5.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A stacking storage arrangement comprising:
   multiple container receiving spaces;
   a loading space arranged below the multiple container receiving spaces;
   a loading vehicle that is movable in the loading space, the loading vehicle comprising a chassis and a container seat that is height-adjustable relative to the chassis;
   a frame arrangement located between the multiple container receiving spaces and the loading space;
   a holding device that is coupled to the frame arrangement and arranged between each container receiving space and the loading space, the holding device being positionable in an opened or a closed position;
   a fixing element that is pivotably coupled to the frame arrangement to engage the holding device in the opened position; and
   a hold-open device arranged on the chassis separately from the container seat, the hold-open device having a pivotable actuating lever arranged to cause the fixing element to engage the holding device in the opened position.

2. The stacking storage arrangement according to claim 1, wherein the holding device comprises multiple holding elements, and
   wherein the hold-open device includes a number of hold-open elements that corresponds at least to a number of the plurality of the holding elements.

3. The stacking storage arrangement according to claim 1, wherein the hold-open device comprises a drive arrangement arranged on the chassis.

4. The stacking storage arrangement according to claim 3, wherein a force-limiting device is arranged between the drive arrangement and the pivotable actuating lever.

5. The stacking storage arrangement according to claim 3, wherein the drive arrangement comprises a preloaded drive element and a motor that acts on the drive element against the preload.

6. The stacking storage arrangement according to claim 5, wherein the motor is embodied as a rotary motor.

7. The stacking storage arrangement according to claim 1, wherein the hold-open device is arranged outside of an opening that connects the container receiving space with the loading space.

8. The stacking storage arrangement according to claim 1, wherein the holding device comprises at least one holding element and the fixing element is movable between a first position, in which the fixing element engages the at least one holding element in the open position, and a second position, in which the fixing element does not act on the at least one holding element, and
   wherein the fixing element is actuatable by the hold-open device.

9. The stacking storage arrangement according to claim 8, wherein the fixing element is pivotably mounted.

10. The stacking storage arrangement according to claim 8, wherein the fixing element is preloaded into the second position.

11. The stacking storage arrangement according to claim 1, wherein the loading vehicle further comprises an unlocking device for releasing the holding device.

12. A method for operating in the stacking storage arrangement according to claim 1, comprising:
    moving the loading vehicle into the loading space;
    lifting the container seat upwardly toward the container receiving space, wherein the container seat lifts at least one container within the container receiving space and wherein the holding device for supporting the at least one container is moved; and
    lowering the container seat and moving the loading vehicle out of the loading space.

13. The method according to claim 12, wherein, when the container seat is lowered, the at least one container is supported on the container seat.

14. The method according to claim 13, wherein the at least one container is supported by the holding device in the container receiving space while the loading vehicle is moved into the loading space, and the method further comprises:

while lifting the at least one container in the container receiving space, moving the holding device into an open position;

actuating the hold-open device to fix the holding device in the open position;

lowering the at least one container past the holding device in the open position to remove the at least one container from the container receiving space; and deactivating the hold-open device, whereby the holding device moves into a closed position after the at least one container is lowered below the holding device.

15. The method according to claim 13, wherein the at least one container removed from the container receiving space comprises multiple containers removed from the container receiving space at a same time.

16. The method according to claim 12, wherein, when the container seat is lowered, the container seat is empty.

17. The method according to claim 16, wherein the at least one container is supported on the container seat while the loading vehicle is moved into the loading space, and the method further comprises:

contacting the holding device with the at least one container to move the holding device out of a closed position as the container is lifted in the at least one container receiving space, wherein, when a support surface of the at least one container is lifted above the holding device, the holding device returns to the closed position; and lowering the at least one container to be supported the holding device.

\* \* \* \* \*